US 6,655,517 B2

(12) United States Patent
Cole et al.

(10) Patent No.: US 6,655,517 B2
(45) Date of Patent: Dec. 2, 2003

(54) CLUTCH FORK WITH EXTERNALLY REMOVABLE SHAFT AND INDICATOR WASHER

(75) Inventors: Christopher D. Cole, Fort Wayne, IN (US); Gene L. Graves, Pleasant Lake, IN (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 10/015,083

(22) Filed: Dec. 11, 2001

(65) Prior Publication Data
US 2003/0106765 A1 Jun. 12, 2003

(51) Int. Cl.[7] .................. F16D 13/58; F16D 13/50; G01D 21/00
(52) U.S. Cl. ............... 192/99 S; 192/30 W; 16/208
(58) Field of Search ............... 192/30 W, 99 S, 192/89.24; 116/28 R, 208, 320, 328, DIG. 21; 74/519, 469

(56) References Cited
U.S. PATENT DOCUMENTS

| | | | | |
|---|---|---|---|---|
| 2,739,680 A | * | 3/1956 | Turner ................ | 192/99 S |
| 3,949,702 A | * | 4/1976 | DeLong ............... | 116/DIG. 21 |
| 4,108,295 A | * | 8/1978 | de Gennes ........... | 192/111 A |
| 4,393,907 A | * | 7/1983 | Kronstadt ............ | 192/99 S |
| 4,573,365 A | * | 3/1986 | Kennard et al. ...... | 192/99 S |
| 5,411,008 A | * | 5/1995 | Hsu .................... | 124/23.1 |
| 5,730,268 A | * | 3/1998 | Villata ................ | 192/30 W |
| 5,911,296 A | * | 6/1999 | Cole et al. ........... | 192/99 S |
| 6,311,818 B1 | | 11/2001 | Cole | |

* cited by examiner

Primary Examiner—Rodney H. Bonck
(74) Attorney, Agent, or Firm—Kevin M. Hinman

(57) ABSTRACT

A clutch fork and clutch housing assembly for use with a motor vehicle clutch includes a clutch housing, a shaft, a fork, a first index mark, and a first washer. The shaft is mounted to the clutch housing and defines an axis of rotation. The fork has a sleeve portion which is disposed over the shaft and is coaxial therewith. The fork has a pair of tines and a lever arm extending from the sleeve portion. The fork is pivotable relative to the clutch housing about the axis of rotation. The first index mark is disposed on the sleeve portion at a first end of the sleeve portion. The first washer is disposed over the shaft and is axially disposed between the first end of the sleeve portion and a corresponding first part of the clutch housing. The first washer is rotatably fixed relative to the clutch housing. An alignment of the first index mark and the second index mark in a clutch-engaged condition indicates one of a worn condition and an unworn condition.

13 Claims, 5 Drawing Sheets

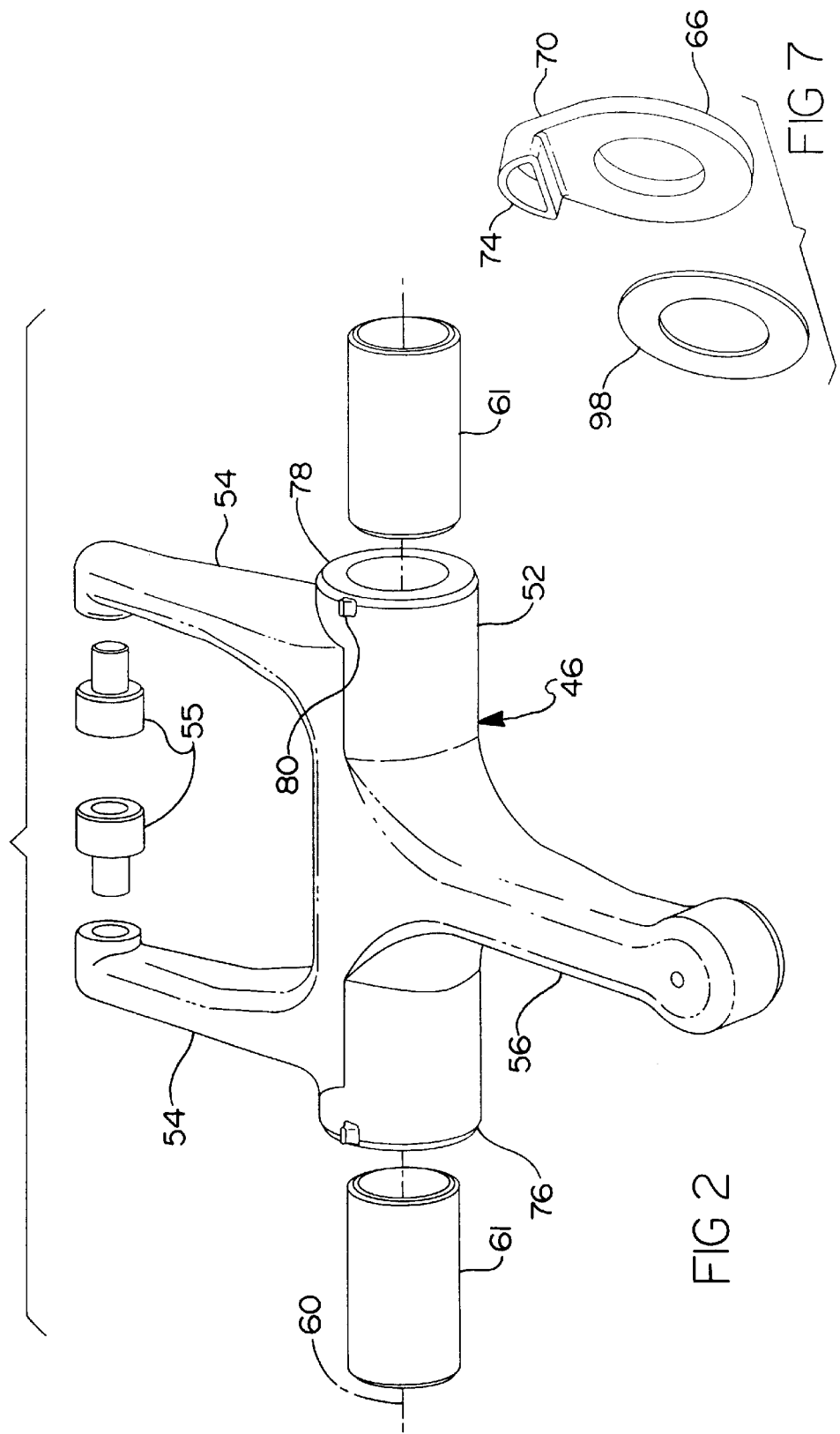

CLUTCH FORK WITH EXTERNALLY REMOVABLE SHAFT AND INDICATOR WASHER

FIELD OF THE INVENTION

This invention relates to the field of friction clutches, and more particularly to release mechanisms for use with friction clutches for heavy duty vehicles.

BACKGROUND OF THE INVENTION

Known friction clutches provide a releasable torsional connection between a motor vehicle engine flywheel and an associated transmission. The basic clutch structure includes a clutch cover, a pressure plate, a driven disc and a flywheel. A clutch housing encloses the clutch and connects the engine block with the transmission housing. The clutch cover is fixed to the flywheel which is in turn fixed to the engine crankshaft. The pressure plate is rotatably fixed but axially displaceable with respect to both the flywheel and the cover. The driven disc is rotatably fixed to an input shaft of the transmission by a splined connection. The driven disc is axially trapped between the flywheel and the pressure plate. The driven disc has friction facing elements on opposite sides of a radially outer disc element for engagement with the flywheel and the pressure plate. The pressure plate is axially biased toward the flywheel by one or more clutch springs to compress the driven disc therebetween, causing the driven disc to rotate as a unit with the pressure plate and flywheel in a clutch engaged condition.

A vehicle operator can selectively release the clutch to allow relative rotation between the input shaft and the engine by displacing a floor mounted clutch pedal with their foot. Displacement of the pedal, transmitted through a linkage, effects an axial movement of a clutch release assembly to a clutch released condition. The clutch release assembly engages the radially innermost tips of clutch levers or diaphragm spring fingers. Displacement of the tips of the levers or fingers, achieved by employing the release assembly, relieves the spring load exerted against the pressure plate, thereby releasing the clutch.

Repeated clutch releases and clutch engagements will cause the friction material to wear. With wear, the location of the release assembly in the engaged condition shifts as the pressure plate moves toward the flywheel. The shift in the position of the release assembly, without the presence of an adjusting mechanism, will present itself to the vehicle operator as a lower clutch pedal height. However, the operator will be unaware of how much remaining useful life the clutch has. In automated systems, in which a clutch is being actuated by an automatic mechanism, no evidence of wear will present itself to the vehicle operator until the clutch begins to slip. To quantify the amount of friction element wear, and to accurately assess the need to replace the driven disc for a typical clutch, one must disconnect the clutch housing and transmission from the engine, and remove the clutch cover and pressure plate assembly from the flywheel.

It is desired to provide a mechanism providing an indication of clutch wear and/or of remaining useful clutch life without separating the transmission from the engine.

SUMMARY OF THE INVENTION

A clutch fork and clutch housing assembly for use with a motor vehicle clutch includes a clutch housing, a shaft, a fork, a first index mark, and a first washer. The shaft is mounted to the clutch housing and defines an axis of rotation. The fork has a sleeve portion which is disposed over the shaft and is coaxial therewith. The fork has a pair of tines and a lever arm extending from the sleeve portion. The fork is pivotable relative to the clutch housing about the axis of rotation. The first index mark is disposed on the sleeve portion at a first end of the sleeve portion. The first washer is disposed over the shaft and is axially disposed between the first end of the sleeve portion and a corresponding first part of the clutch housing. The first washer is rotatably fixed relative to the clutch housing. An alignment of the first index mark and the second index mark in a clutch-engaged condition indicates one of a worn condition and an unworn condition.

A clutch fork washer for use with a motor vehicle clutch fork has a substantially annular body portion. The washer has a first aperture passing therethrough. The washer also has anti-rotation feature extending axially therefrom, and a plurality of index marks disposed on a side opposite the axially extending anti-rotation feature.

A clutch fork and clutch housing assembly for use with a motor vehicle clutch includes a clutch housing, a shaft, and a fork. The shaft is mounted to the clutch housing and defines an axis of rotation. The fork has a sleeve portion disposed over the shaft and coaxial therewith. The fork also has a pair of tines and a lever arm extending from the sleeve portion. The fork is pivotable relative to the clutch housing about the axis of rotation. The shaft is selectively removable from the housing and the fork from an outside of the clutch housing.

The disclosed clutch provides a mechanism for indicating clutch wear and/or remaining useful clutch life without separating the transmission from the engine.

BRIEF DESCRIPTION OF THE DRAWINGS

FIG. 2 is a perspective view of a clutch fork of the clutch assembly of FIG. 1.

FIG. 7 is a perspective view of a washer and a spacer washer combination for use with the clutch of FIG. 1.

DESCRIPTION OF PREFERRED EMBODIMENTS

Figure 1:
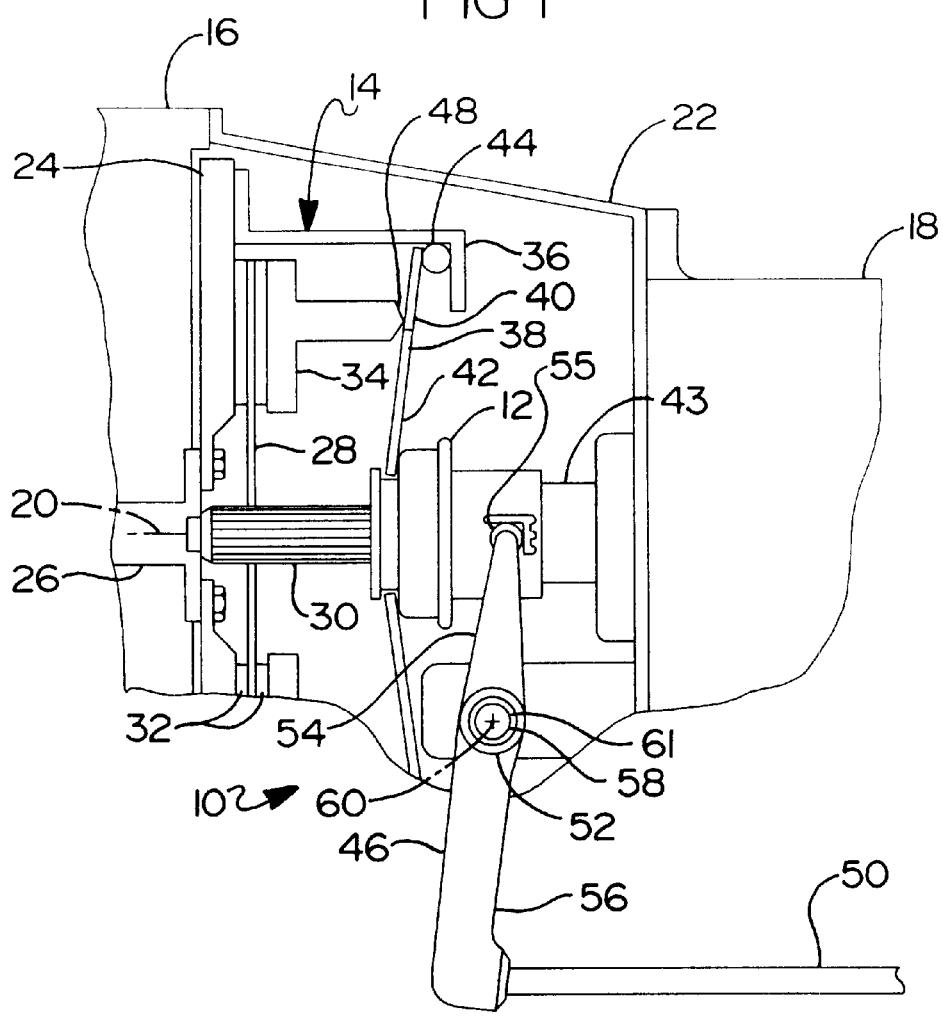
FIG. 1 is a schematic sectional top view of a clutch assembly configured for a single disc clutch.

A schematic diagram of a single disc system is shown in FIG. 1. A clutch release mechanism 10 is commonly selectively actuated by a vehicle operator with their foot using a clutch pedal. The motion of the clutch pedal is transferred through a linkage to a clutch release assembly 12. Alternatively, actuation could be provided by an automated mechanism, such as an electric servo or a hydraulic or pneumatic actuator. A single disc frictional clutch 14 drivingly connects an engine 16 with a transmission 18. Clutch 14 rotates about an axis 20. A clutch housing 22, also referred to as a bell housing, rigidly connects an engine block of engine 16 with a housing of transmission 18. A flywheel 24 is rotatably fixed to a crankshaft 26 of engine 16. A driven disc 28, centered with respect to axis 20, has a splined hub portion which slidably engages a splined input shaft 30 of transmission 18. Driven disc 28 is sandwiched between flywheel 24 and a pressure plate 34. Driven disc 28 has non-cushion friction elements 32 which are engaged by flywheel 24 and pressure plate 34 when clutch 14 is in an engaged condition.

A cover 36 is disposed over pressure plate 34 and is fixed to flywheel 24. A plurality of straps (not shown) circumferentially extend between pressure plate 34 and cover 36. The straps rotatably fix pressure plate 34 to cover 36 while allowing relative axial displacement of pressure plate 34 to cover 36. The straps are configured to serve as springs which bias pressure plate 34 away from flywheel 24.

A diaphragm spring 38 is axially disposed between cover 36 and pressure plate 34. An annular portion 40 of diaphragm spring 38 biases pressure plate 34 toward flywheel 24, clamping driven disc 28 between flywheel 24 and pressure plate 34 to rotatably connect or lock input shaft 30 with flywheel 24 when clutch 10 is in an engaged position. Diaphragm spring 38 has a plurality of radially extending fingers 42, the radially inner tips of which are engaged by the axially displaceable release assembly 12. Release assembly 12 is slidably disposed over input shaft 30. Release assembly 12 may be disposed directly over input shaft 30 or on a quill 43 surrounding input shaft 30. A pivot ring 44, or other pivot feature such as a bead formed in the cover, is axially disposed between an outer diameter of annular portion 40 and cover 36. Ring 44 facilitates the pivoting or flexing of annular portion 40 relative to cover 36.

Clutch 14 is selectively released or disengaged by axially displacing release assembly 12 along axis 20 in a direction away from flywheel 24 against the force of diaphragm spring 38. Such displacement is achieved by a vehicle operator depressing the pedal, with the motion of the pedal being transferred via the linkage through a clutch release fork 46, or simply a clutch fork 46, to displace release assembly 12. As the radially inner tips of fingers 42 are axially displaced away from flywheel 24, fingers 42 bow, causing annular portion 40 to deflect, thereby relieving the clamping load against pressure plate 34, and permitting rotation of input shaft 30 relative to flywheel 24. Annular portion 40 engages a fulcrum 48 of pressure plate 34 proximate to an inner diameter of annular portion 40.

A push rod 50 engages clutch fork 46, and causes fork 46 to pivot against clutch release assembly 12.

Clutch fork 46 is pivotably mounted within clutch housing 22. Clutch fork 46 has a sleeve portion 52. A pair of tines 54 extend from the sleeve portion 52 in parallel with each other and normal to the sleeve portion 52 and engage release assembly 12. Engagement rollers 55 are disposed on an inboard side of each of tines 54. A lever arm 56 also extends from sleeve portion 52 midway between tines 54 in a direction approximately opposite the direction of tines 54 and is engaged by push rod 50. The lever arm's location relative to tines 54 is a function of the packaging and orientation of the clutch actuating mechanism and linkage and can be varied from that described herein.

Fork 46, as best shown in FIG. 2, is disposed over a fork shaft 58. Fork shaft 58 is fixed to clutch housing 22 and defines a fork axis of rotation 60 about which fork 46 pivots. A pair of bushings 61 are pressed into sleeve portion 52 to serve as bearings between fork 46 and shaft 58. It should be appreciated that other forms of bearings such as needle roller bearings could be potentially employed, or the bearings of any form might even be done without. Shaft 58 is supported on both ends by housing mounting features in the form of first and second bosses 62 and 64 outboard of sleeve portion 52.

Figure 3:
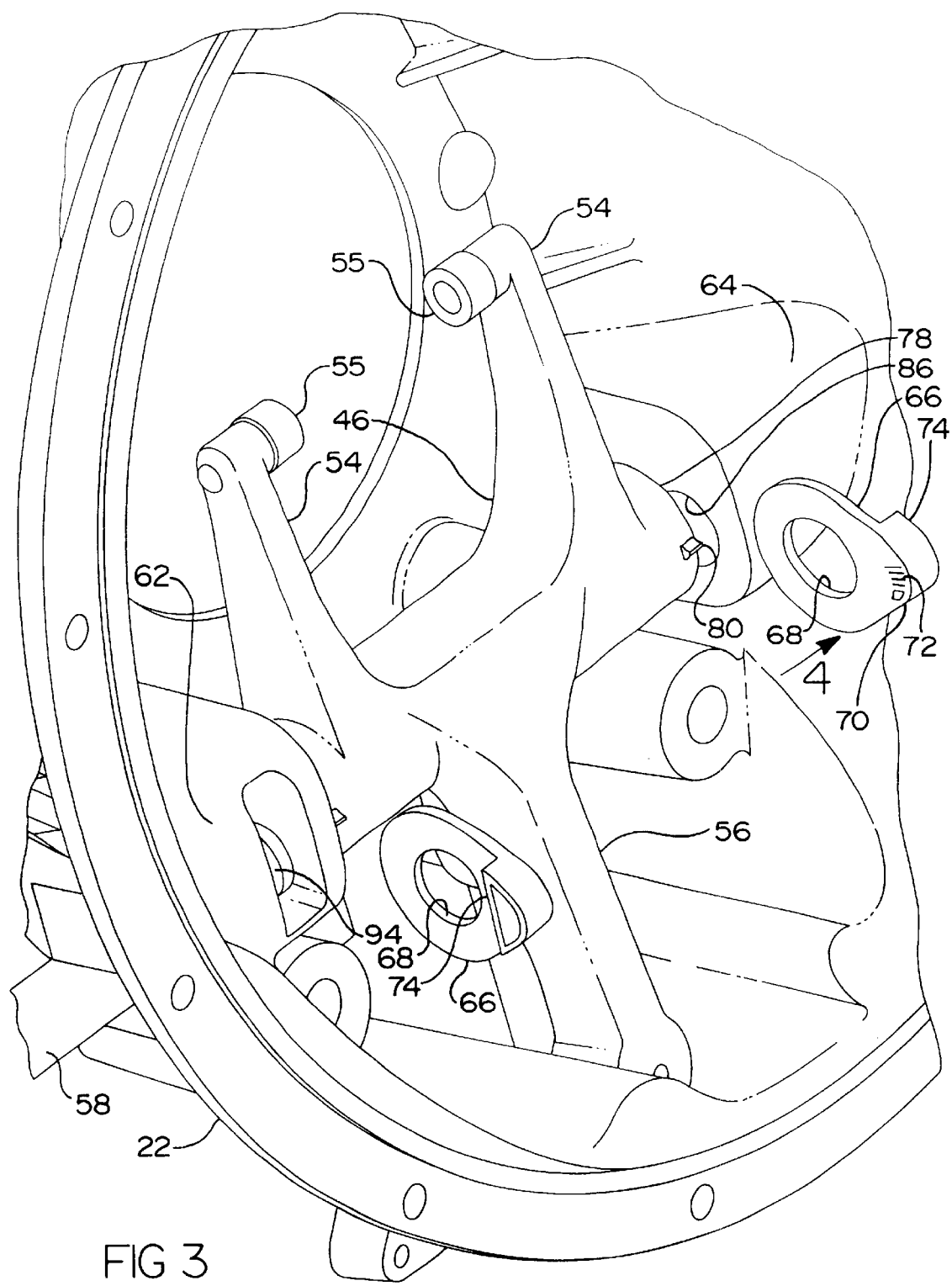
FIG. 3 is a perspective exploded view of t clutch housing and fork assembly of the clutch of FIG. 1.

As best shown in FIG. 3, a washer 66 is disposed over shaft 58 at both a first end 76 and a second end 78 of sleeve portion 52 between fork 46 and bosses 62 and 64. Washer 66 is formed of a plastic such as nylon. In a preferred embodiment, the plastic includes, in addition to the nylon, 2% silicone and 13% polytetra-fluoroethylene. Washer 66 may be filled with a reinforcing fiber such as fiberglass.

Figure 4:
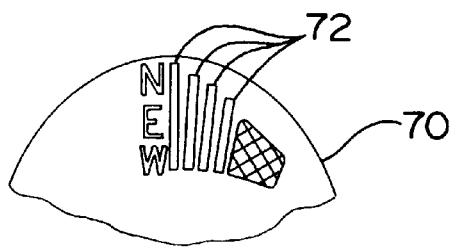
FIG. 4 is a side view detail of the lobe of a washer shown in the direction of Arrow 4 in FIG. 3.

Washer 66, having a central aperture 68, is substantially annular in shape. Washer 66 is somewhat oblong, having a lobe 70 on one side. Lobe 70 has a plurality of index marks 72 on a side facing sleeve portion 52. The index marks 72 are best shown in FIG. 4. The word "NEW" is molded into washer 66 adjacent index marks 72 at a tip of lobe 70 to clearly distinguish the unworn condition from the worn condition. A cross-hatched area is marked on the side of index marks 72 opposite "NEW" to indicate the clutch worn or replace condition.

Lobe 70 also has an axially extending anti-rotation lug 74 disposed on a side opposite sleeve portion 52 and extending over its associated boss. Lug 74 is substantially D shaped with the flat of the D engaging a side of bosses 63 and 64 to prevent the rotation of washer 66 about axis 60. Lug 74 is hollow to facilitate the molding of washer 66.

First and second ends 76 and 78 of sleeve portion 52 have a single index mark 80 in the form of a pointed projection or pointer 80 on an outer diameter of sleeve portion 52. As the friction elements 32 of driven disc 28 wear, pointer 80 moves relative to marks 72 in an engaged condition. In an unworn condition, pointers 80 are aligned with the washer index marks 72 at a tip of lobe 70 adjacent the word NEW. In the worn condition, pointers 80 shift toward or over the cross-hatched areas.

Figure 5:
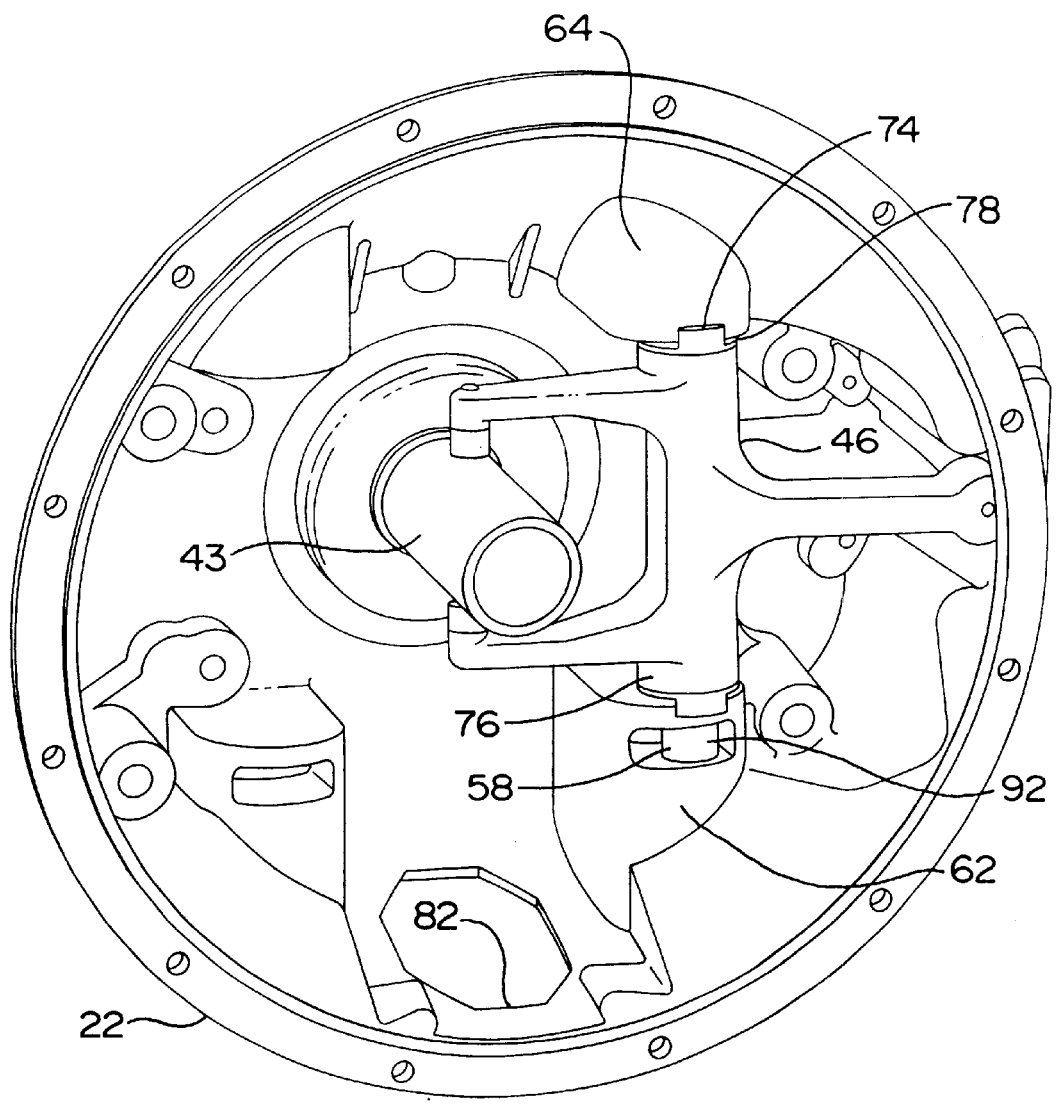
FIG. 5 is a perspective view of the clutch housing and fork assembly of the clutch of FIG. 1.

An inspection window 82, best seen in FIG. 5, is provided in housing 22 to enable viewing of index marks 72 and pointer 80 at the second end 78 of sleeve portion 52.

Figure 6:
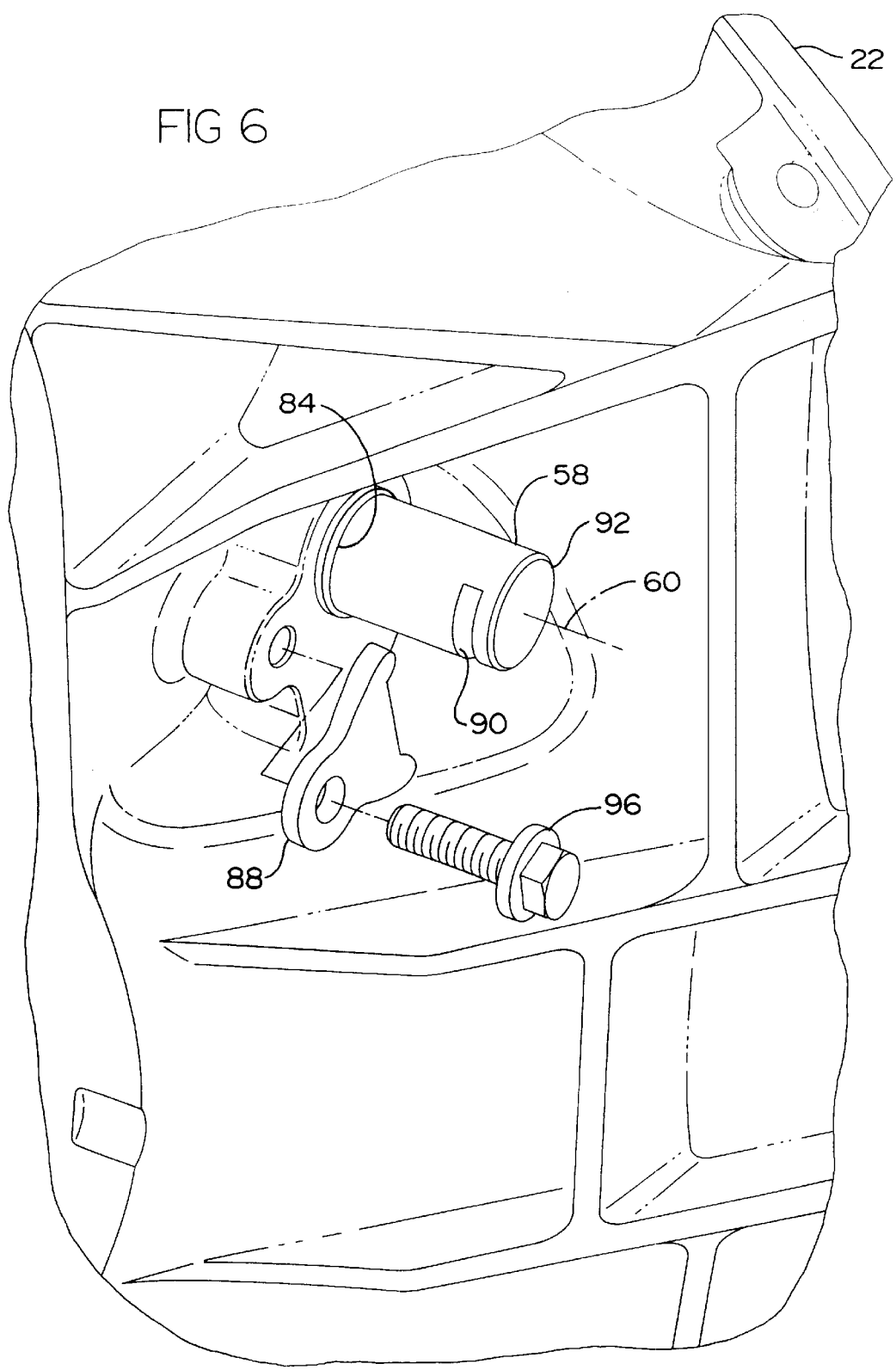
FIG. 6 is a perspective exploded view of the fork shaft mounting elements of the clutch of FIG. 1 viewed from an outside of the housing.

Fork 46 is installed in housing 22 as follows. Bushings 61 are pressed into sleeve portion 52. Washers 66 and fork 46 are aligned on axis 60 with apertures 84 and 86 in bosses 62 and 64. Lugs 74 are oriented outwardly. Shaft 58 is passed through first shaft aperture 84, the aligned fork 46 and washers 66 and second shaft aperture 86. First shaft aperture 84 is a through hole, passing through boss 62 at a bottom of housing 22. Second shaft aperture 86 is a blind hole in boss 64, and is open to an inside of housing 22. A crow's foot clip 88, best shown in FIG. 6, is slipped into a notch 90 in shaft 58 proximate to a first end 92 of shaft 58. A second end 94 of shaft 58 is received by second shaft aperture 86. Clip 88 is fixed to housing 22 by a bolt 96, fixing shaft 58, fork 46 and washers 66 in housing 22. Washers 66, even though identical, are disposed on opposite ends of shaft 58. The use of identical washers with identical index marks results in pointers 80 providing an indication of wear on the upper side of fork 46. This will not result in any confusion with respect to the monitoring of wear, as only the washer 66 on the upper side can be viewed through inspection window 82. Further, with only one washer configuration, there will be no opportunity to confuse unique first side and second side washers during assembly, as both are identical. Accordingly, there is a need for only one pointer 80 on the second end 78 of sleeve portion 52.

Foam spacer washers 98 may be employed between housing 22 and the ends 76 and 78 of sleeve portion 52. The spacer washers 98 are of approximately the same diameter as washers 66. Silicone foam is well suited for use as the material for washers 98. Spacer washers 98 beneficially eliminate any need to machine bosses 62 and 64 to provide a flat surface for washers 66 to seat against. Spacer washers 98 also provide a seal between shaft 58 and housing 22 to block the entry of road debris into housing 22, and also blocks the entry of corrosive contaminants, such as salt water, from reaching the interface between shaft 58 and bushings 61. Spacer washers 98 also beneficially center fork 46 within housing 22 between bosses 62 and 64. Bonding spacer washers 98 to washers 66 simplifies assembly.

It should be appreciated that there are yet additional readily apparent alternative embodiments to the above described clutch configurations. Clutches may employ a plurality of angle springs and levers in place of diaphragm spring 38. Clutch release assembly 12 could alternatively be in a multiple disc form, as dual disc clutches are commonly used in heavy-duty arrangements.

The embodiments disclosed herein have been discussed for the purpose of familiarizing the reader with the novel aspects of the invention. Although preferred embodiments of the invention have been shown and disclosed, many changes, modifications and substitutions may be made by one having ordinary skill in the art without necessarily departing from the spirit and scope of the invention as described in the following claims.

What is claimed is:

1. A clutch fork and clutch housing assembly for use with a motor vehicle clutch comprising:
   a clutch housing;
   a shaft mounted to the clutch housing and defining an axis of rotation;
   a fork having a sleeve portion disposed over the shaft and coaxial therewith and the fork having a pair of tines and a lever arm extending from the sleeve portion with the fork being pivotable relative to the clutch housing about the axis of rotation;
   a first index mark on the sleeve portion at a first end of the sleeve portion; and
   a first washer disposed over the shaft and axially disposed between the first end of the sleeve portion and a corresponding first part of the clutch housing, and the first washer being rotatably fixed relative to the clutch housing, and an alignment of the first index mark and a second index mark in a clutch-engaged condition indicating one of a worn condition and an unworn condition.

2. A clutch fork and clutch housing assembly as claimed in claim 1 wherein the shaft is rotatably fixed to the clutch housing and the fork pivots about the shaft.

3. A clutch fork and clutch housing assembly as claimed in claim 2 wherein the shaft is selectively removable through an outside of the clutch housing.

4. A clutch fork and clutch housing assembly as claimed in claim 3 wherein the shaft is slidably received in the axial direction by a first retaining boss of the clutch housing and the washer and the fork sleeve and a second retaining boss of the clutch housing.

5. A clutch fork and housing assembly as claimed in claim 4 wherein the shaft has an engagement slot at one of its ends engaged by an engaging member and is thereby axially retained within the clutch housing.

6. A clutch fork and clutch housing assembly as claimed in claim 1 wherein the first washer has an axially extending portion engaging the housing to rotatably fix the washer to the housing.

7. A clutch fork and clutch housing assembly as claimed in claim 6 wherein the first washer has a plurality of index marks on a surface normal to the axis of rotation and disposed toward the shaft.

8. A clutch fork and clutch housing assembly as claimed in claim 7 wherein the axially extending portion of the first washer overlies a first retaining boss of the clutch housing in which a first end of the shaft is disposed.

9. A clutch fork and housing assembly as claimed in claim 1 wherein:
   a second washer is disposed over the shaft and is axially disposed between a second end of the sleeve portion and a corresponding second part of the clutch housing.

10. A clutch fork and housing assembly as claimed in claim 9 wherein the shaft is rotatably fixed to the clutch housing and the fork pivots about the shaft, and further wherein the shaft is selectively removable through an outside of the clutch housing.

11. A clutch fork washer for use with a motor vehicle clutch fork comprising:
    a substantially annular body portion having a first aperture passing therethrough and having an anti-rotation feature extending axially therefrom and having a plurality of index marks disposed on a side opposite the axially extending anti-rotation feature.

12. A clutch fork washer as claimed in claim 11 wherein the index marks are disposed on a radially extending lobe of the washer.

13. A clutch fork washer as claimed in claim 12 wherein the anti-rotation feature is disposed on the lobe opposite the index marks.

* * * * *